(12) United States Patent
Tsai

(10) Patent No.: US 9,222,669 B2
(45) Date of Patent: Dec. 29, 2015

(54) GAS COMBUSTOR

(71) Applicant: Chin-Lin Tsai, New Taipei (TW)

(72) Inventor: Chin-Lin Tsai, New Taipei (TW)

( * ) Notice: Subject to any disclaimer, the term of this patent is extended or adjusted under 35 U.S.C. 154(b) by 383 days.

(21) Appl. No.: 13/845,367

(22) Filed: Mar. 18, 2013

(65) Prior Publication Data

US 2013/0309619 A1 Nov. 21, 2013

(30) Foreign Application Priority Data

May 17, 2012 (TW) .............................. 101209303 A

(51) Int. Cl.
| | |
|---|---|
| *F23D 14/28* | (2006.01) |
| *F16K 7/00* | (2006.01) |
| *F23D 14/02* | (2006.01) |
| *F23Q 7/12* | (2006.01) |
| *F23Q 3/00* | (2006.01) |
| *F23D 14/38* | (2006.01) |
| *F23D 14/68* | (2006.01) |
| *F16K 31/126* | (2006.01) |

(52) U.S. Cl.
CPC . *F23D 14/28* (2013.01); *F16K 7/00* (2013.01); *F16K 31/1262* (2013.01); *F23D 14/02* (2013.01); *F23D 14/38* (2013.01); *F23D 14/68* (2013.01); *F23Q 3/00* (2013.01); *F23Q 7/12* (2013.01); *Y10T 137/8122* (2015.04)

(58) Field of Classification Search
CPC ..... F23D 14/02; F23D 14/28; G05D 16/0655; G05D 16/0663
See application file for complete search history.

(56) References Cited

U.S. PATENT DOCUMENTS

| | | | | |
|---|---|---|---|---|
| 4,128,391 A | * | 12/1978 | Braunstein | 431/354 |
| 4,791,957 A | * | 12/1988 | Ross | 137/505.12 |
| 5,816,794 A | * | 10/1998 | Tsai | 431/344 |
| 5,961,319 A | * | 10/1999 | Tsai | 431/344 |
| 2006/0251573 A1 | * | 11/2006 | Musick et al. | 423/613 |

* cited by examiner

*Primary Examiner* — Steven B McAllister
*Assistant Examiner* — Rabeeul Zuberi
(74) *Attorney, Agent, or Firm* — Guice Patents PLLC

(57) ABSTRACT

The present invention relates to a gas combustor, comprising: a gas intake valve, the bottom of a valve tube axially formed in a valve member is installed with a filter member, a first spring is installed above the filter member and inside the valve tube, the top of a valve pin is protruded out of a tube opening formed at and communicated with the top of the valve tube, a plug outwardly protruded at the bottom of the valve pin is abutted against the first spring, the plug is enabled to seal the tube opening through the first spring being stretched, and when the top of the valve pin is axially subject to a force, the valve pin and the plug are downwardly moved, the first spring is compressed thereby enabling the tube opening to be opened.

12 Claims, 9 Drawing Sheets

GAS COMBUSTOR

BACKGROUND OF THE INVENTION

1. Field of the Invention

The present invention relates to a gas combustor, especially to a gas combustor capable of filtering the impurities contained in fuel.

2. Description of Related Art

Fire is a must have element in our lives, with fire, we can cook food, can be provided with lighting, and the fire can also be used for combustion operations such as forging, soldering and welding. Take a gas tank for example, liquid gas is contained therein, the gas tank can be used for refilling a lighter or combined in a portable gas stove for lighting objects or cooking food, thereby providing convenience in use. In addition, the gas tank has feature of easy to be carried around and stored, so it plays an important role in our lives which cannot be easily replaced.

With the convenience provided by the gas tank, there are two types of gas combustors in the marketplace, take the U.S. Pat. No. 5,466,149 (corresponding to the Taiwan Utility Patent No. 110192) and the U.S. Pat. No. 5,564,919 (corresponding to the Taiwan Utility Patent No. 112652) granted to the applicant of the present invention have disclosed a gas combustor, in which a connection nozzle at the bottom thereof is connected to a gas discharge valve of a gas tank, so liquid gas can be ejected into a fuel storage tank, thereby enabling a gas discharge device installed in the gas combustor to be provided with the gas and a combustion device to be provided with fuel. Another type of gas combustor is illustrated as following: take the U.S. Pat. No. 5,735,353 (corresponding to the Taiwan Utility Patent No. 134495) and the U.S. Pat. No. 5,816,794 (corresponding to the Taiwan Utility Patent No. 122521) granted to the applicant of the present invention have disclosed a gas combustor, in which a support device is installed below the gas combustor, after being connected with a gas tank available in the marketplace, the fuel in the gas tank is enabled to be vaporized for supplying to the whole combustion device, thereby being able to be used for soldering or welding or other combustion operations.

In the second type of gas combustor mentioned above, massive amount of fuel gas would be ejected due to the high pressure released by the gas tank, thereby larger flame can be provided for processing a continuous or large scale combustion operation. However, the interior of the gas tank may have metal debris generated by the inner wall being corroded or the electroplating layer being peeled off, so some impurities such as particles may be contained in the gas tank, the impurities often causes the gas ejecting nozzle of a gas discharge device to be clogged thereby causing the gas ejecting nozzle not being able to normally supply the fuel gas.

Moreover, during the process of soldering, welding or baking, the user may hold the gas tank in an upside down manner. At this moment, the liquid gas may not be vaporized in time due to the high pressure released, so as to be directly ejected from a flame nozzle in the liquid phase, thereby generating incomplete combustion, thus the combustion efficiency is not able to be increased and accidents may therefore occur. Furthermore, on some low temperature occasions, because the environmental temperature is relatively low, the liquid gas would not be fully vaporized while the liquid gas in the gas tank being converted into gaseous phase, thereby causing a disadvantage of the gas combustor not being easily to be ignited.

As such, how to effectively filter the impurities contained in fuel for being used in a gas combustor is a serious issue to be concerned by skilled people in the art.

SUMMARY OF THE INVENTION

One primary objective of the present invention is to provide a gas combustor, in which the upstream end of a pressure stabilizing device is installed with a gas intake valve used for controlling whether fuel being supplied to the pressure stabilizing device, a filter member is further installed for filtering the impurities contained in fuel, thereby solving the problem of a gas ejecting nozzle of a gas discharge device being easily to be clogged.

For achieving aforesaid objective, one technical solution of the present invention is to provide a gas combustor, which comprises: a gas intake valve, the bottom of a valve tube axially formed in a valve member is installed with a filter member, a first spring is installed above the filter member and inside the valve tube, the top of a valve pin is protruded out of a tube opening formed at and communicated with the top of the valve tube, a plug outwardly protruded at the bottom of the valve pin is abutted against the first spring, the plug is enabled to seal the tube opening through the first spring being stretched, and when the top of the valve pin is axially subject to a force, the valve pin and the plug are downwardly moved, the first spring is compressed thereby enabling the tube opening to be opened.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
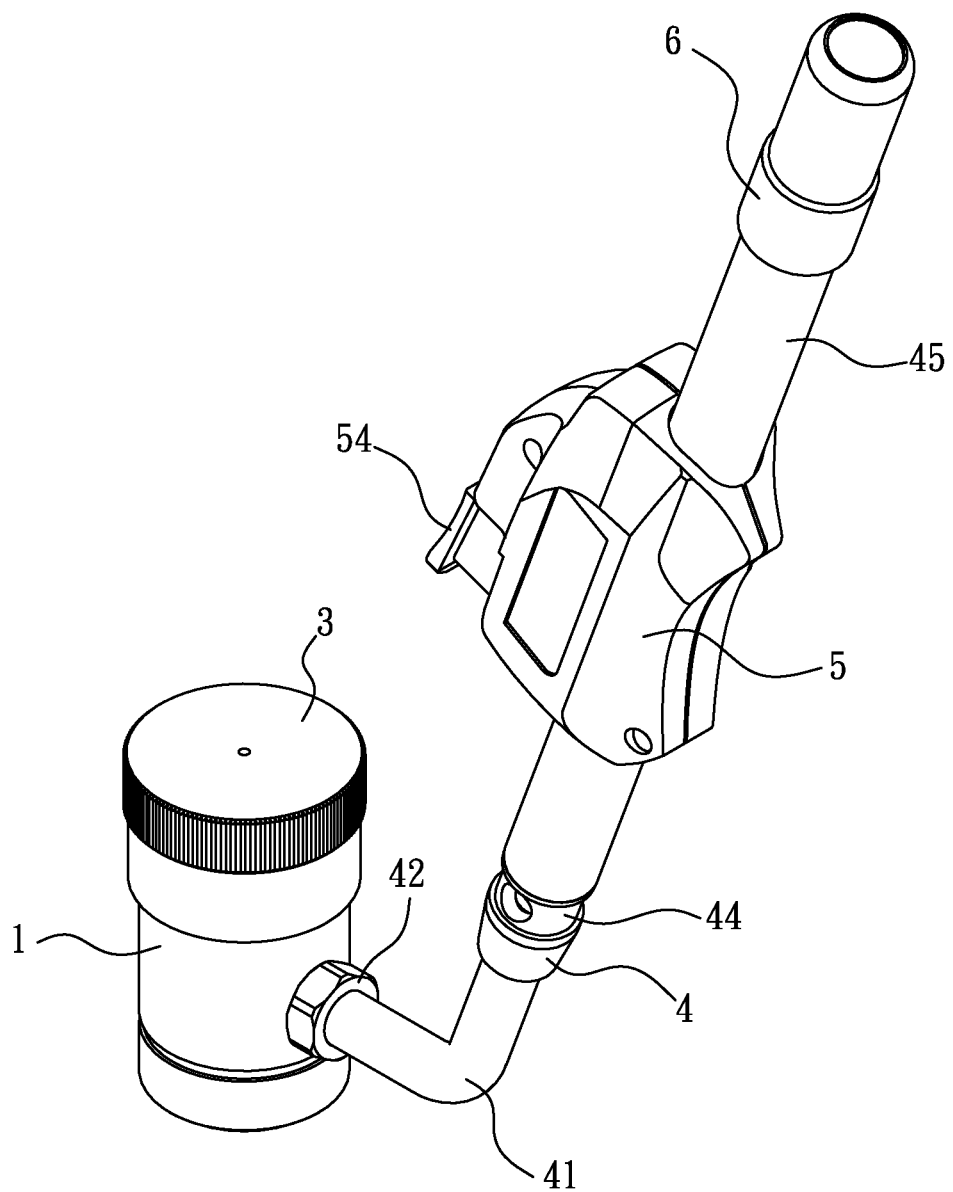
FIG. 1 is a perspective view illustrating the gas combustor according to a first embodiment of the present invention.
Figure 2:
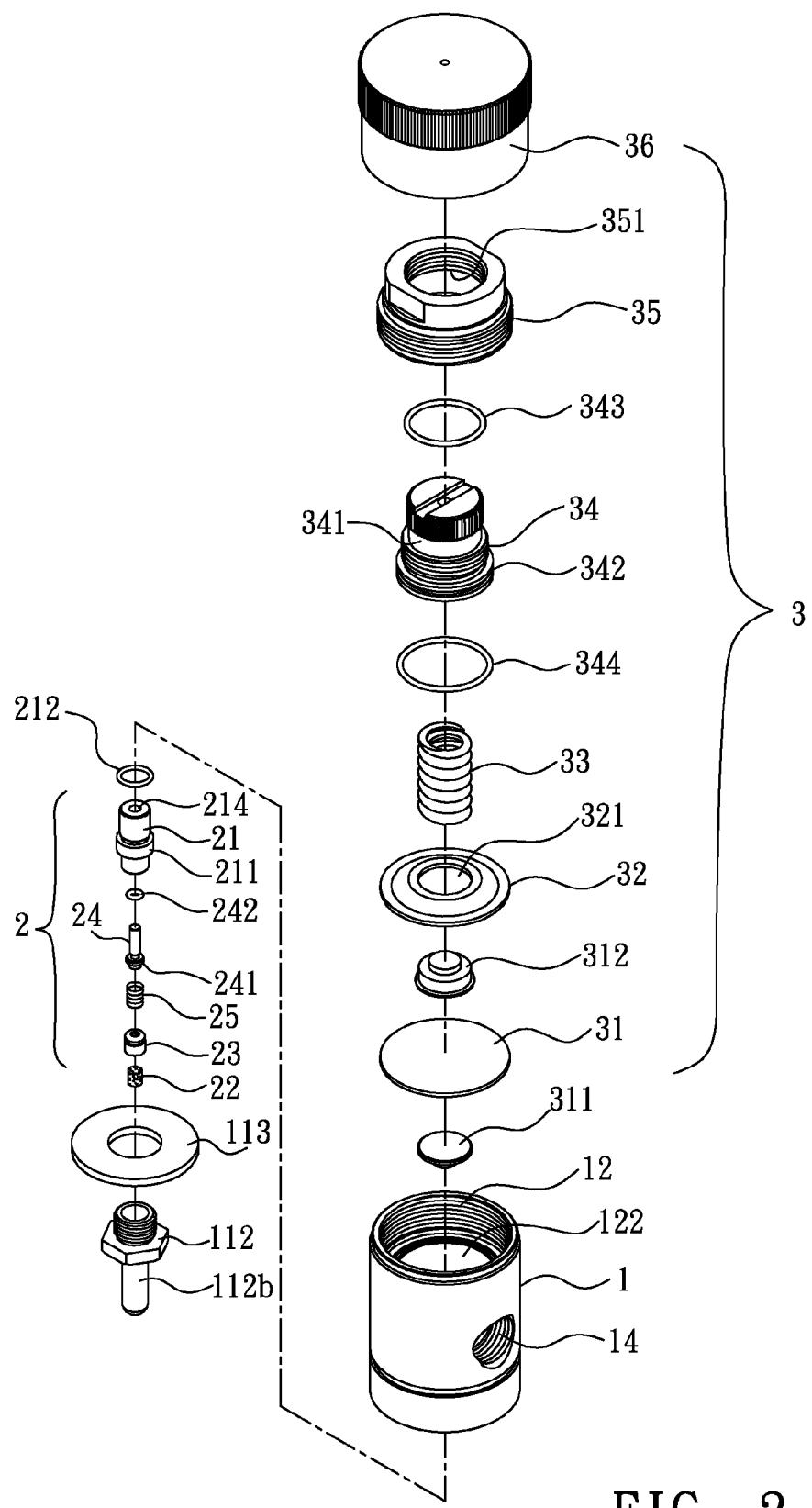
FIG. 2 is a perspective exploded view illustrating the base, the pressure stabilizing device and the gas intake valve according to the first embodiment of the present invention.
Figure 3:
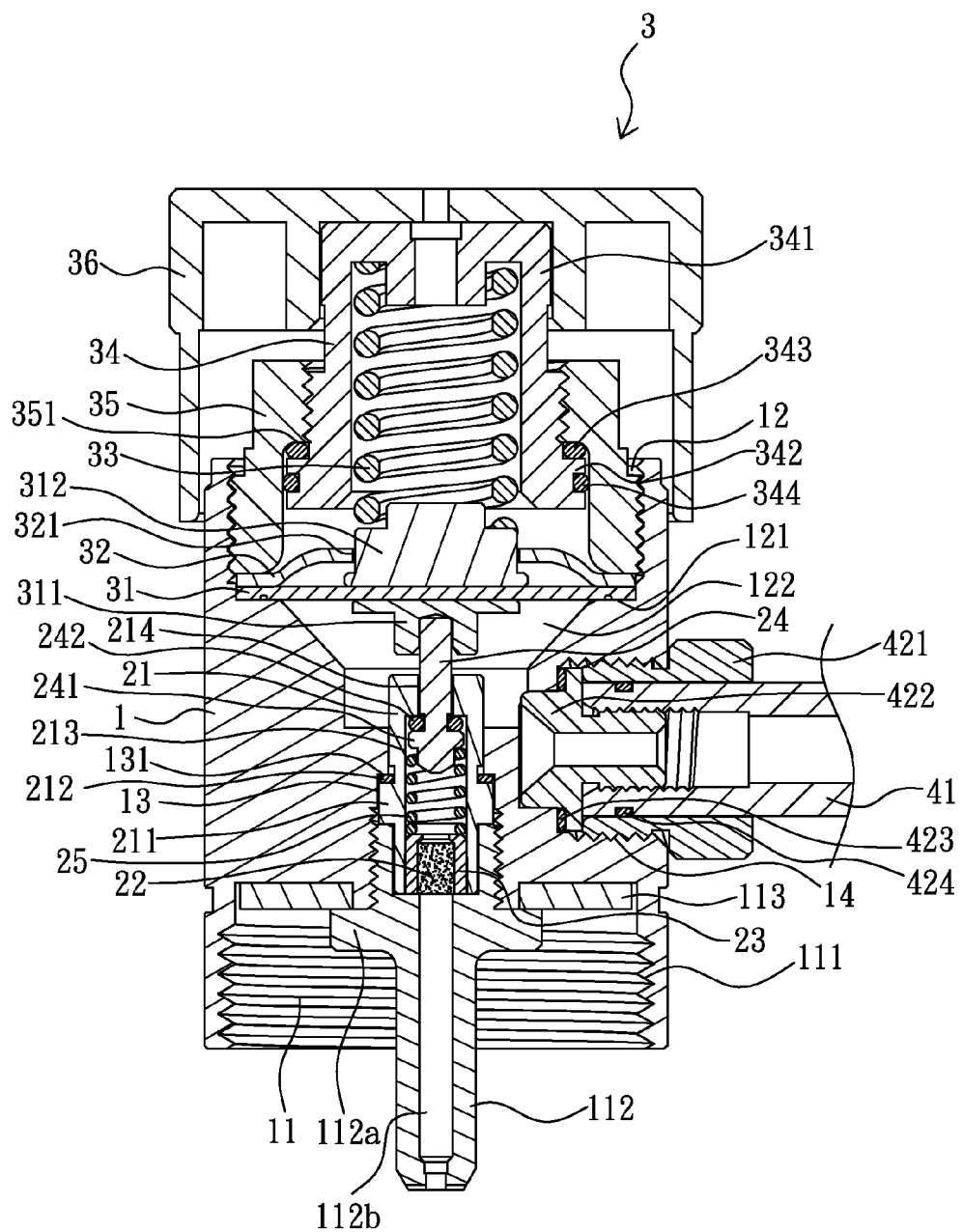
FIG. 3 is a cross sectional view illustrating the assembly of the base, the pressure stabilizing device and the gas intake valve shown in FIG. 2 according to the first embodiment of the present invention.
Figure 4A:
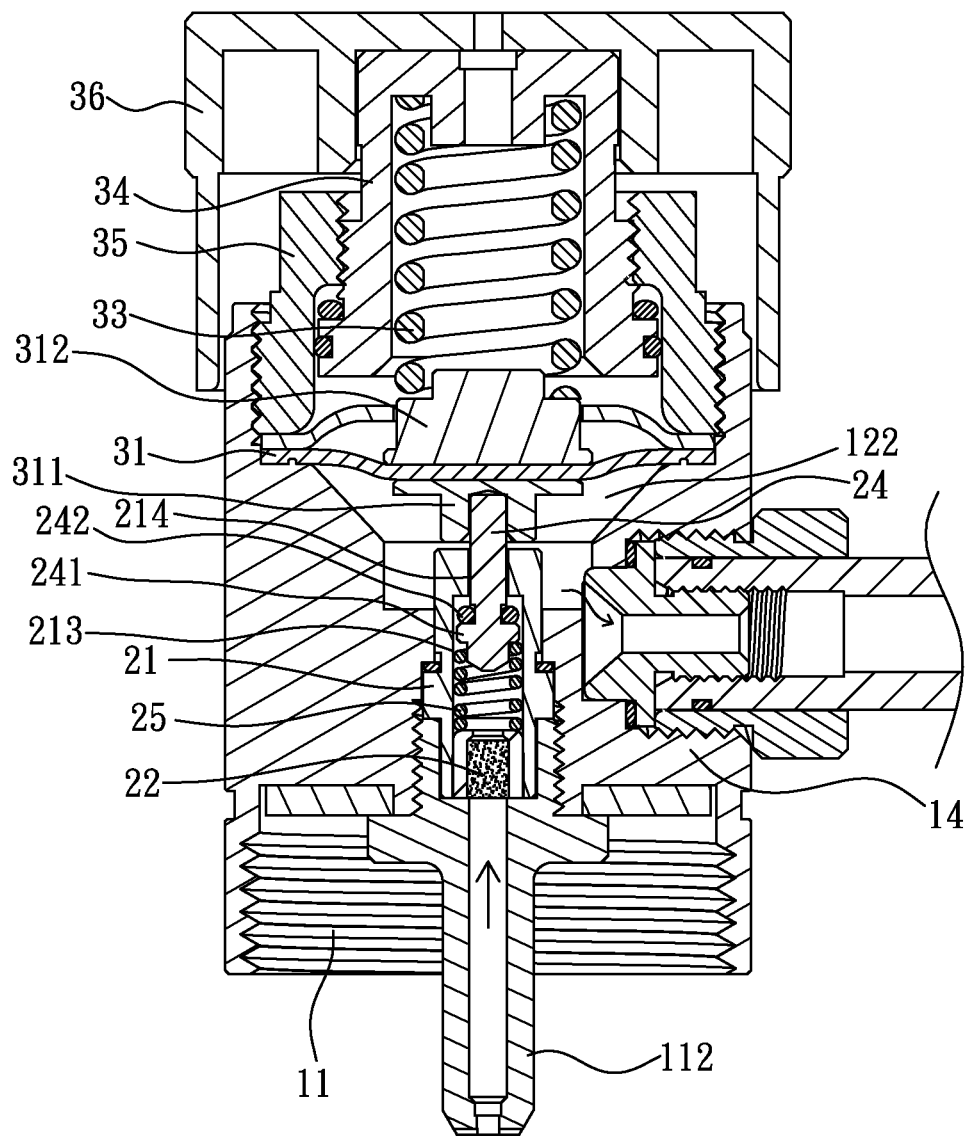
FIG. 4a is a cross sectional view illustrating the operation of the pressure stabilizing device and the gas intake valve according to the first embodiment of the present invention.
Figure 4B:
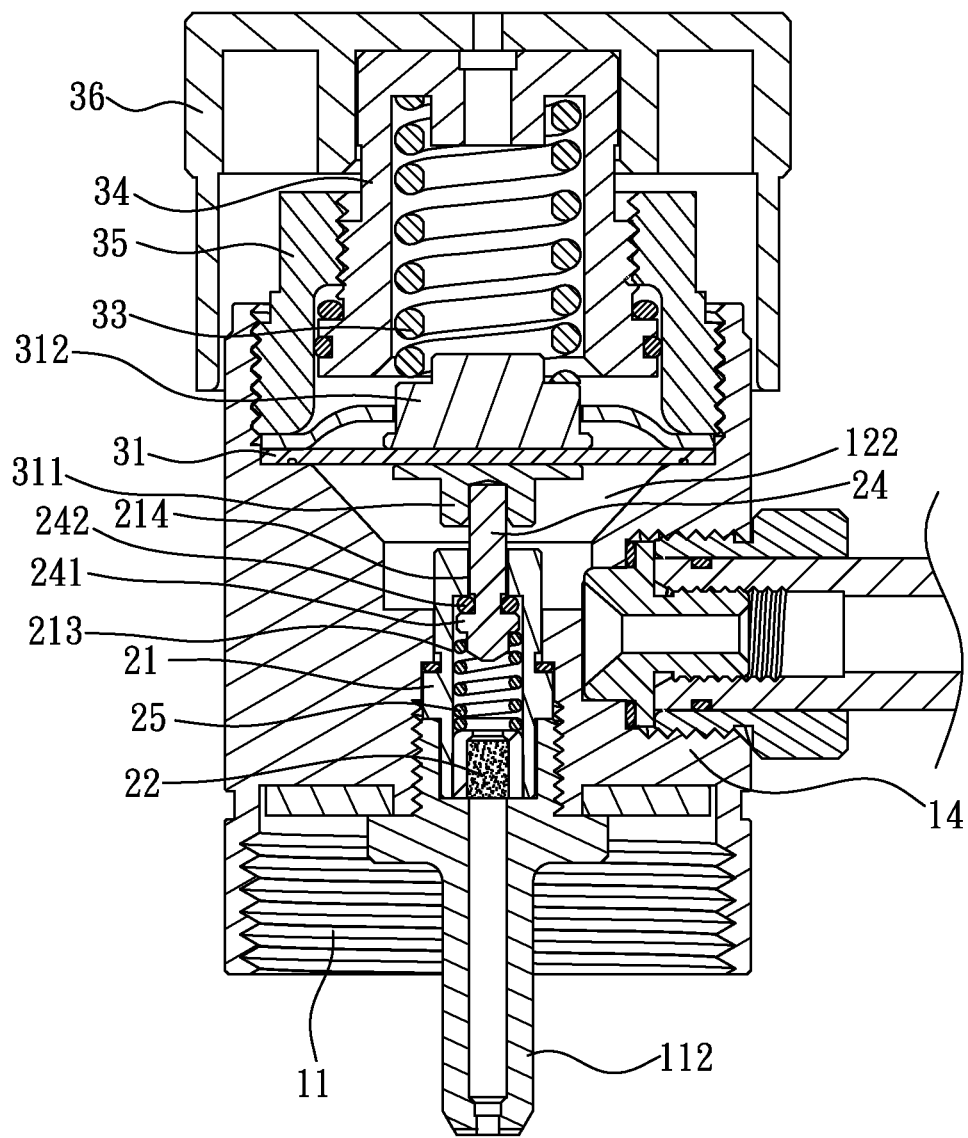
FIG. 4b is another cross sectional view illustrating the operation of the pressure stabilizing device and the gas intake valve according to the first embodiment of the present invention.
Figure 5:
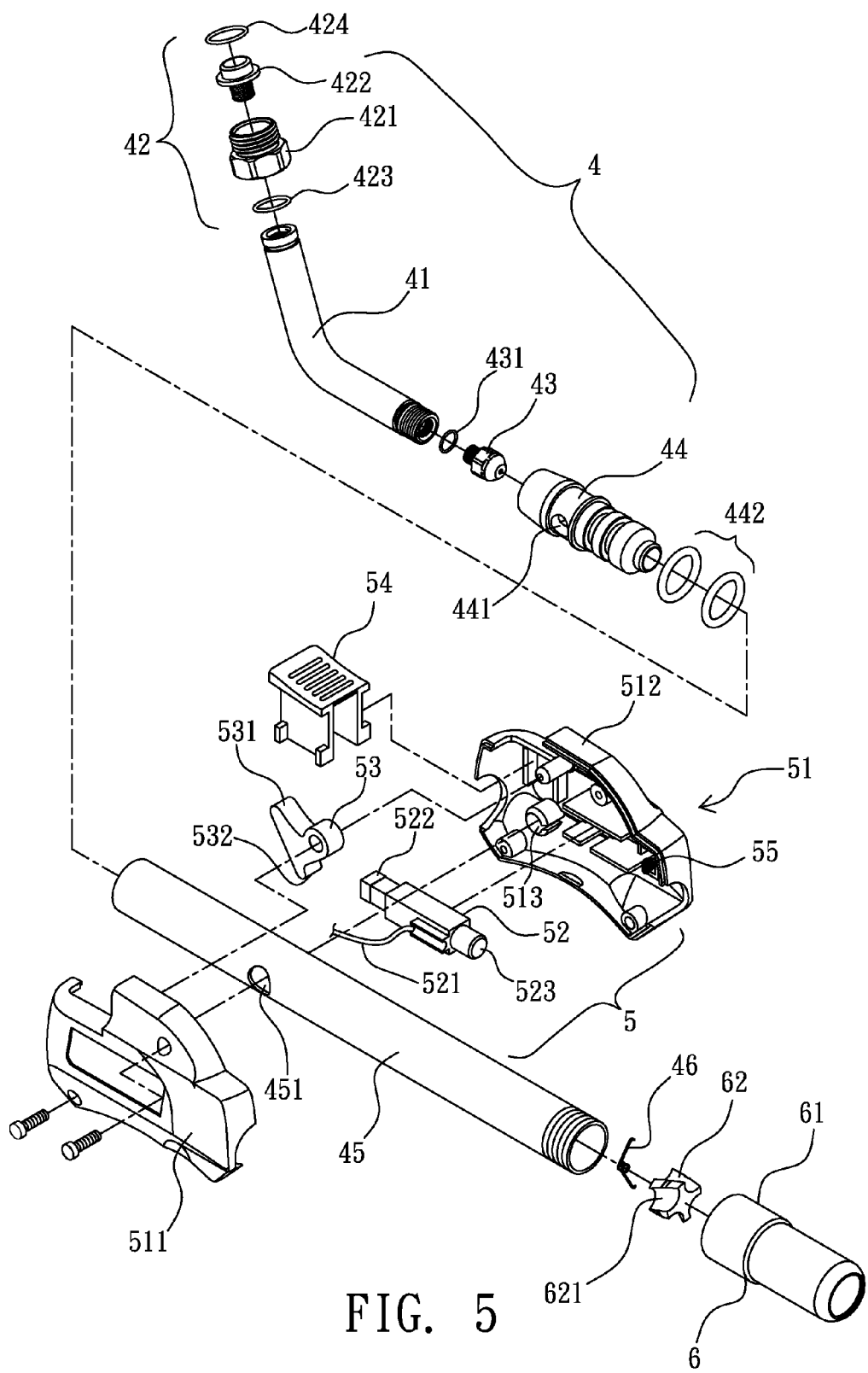
FIG. 5 is a perspective exploded view illustrating the gas discharge device, the ignition device and the combustion device according to the first embodiment of the present invention.
Figure 6:
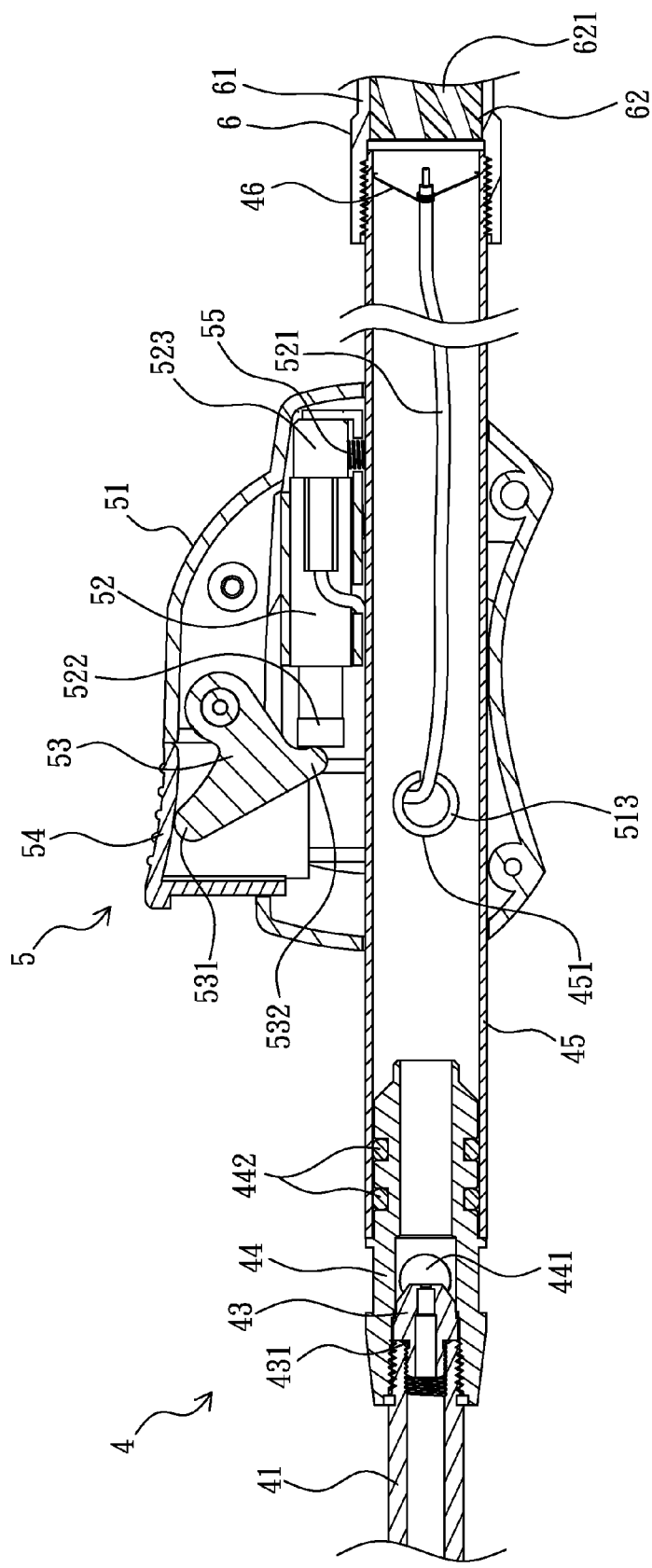
FIG. 6 is a partial cross sectional view illustrating the assembly of the gas discharge device, the ignition device and the combustion device shown in FIG. 5 according to the first embodiment of the present invention.
Figure 7:
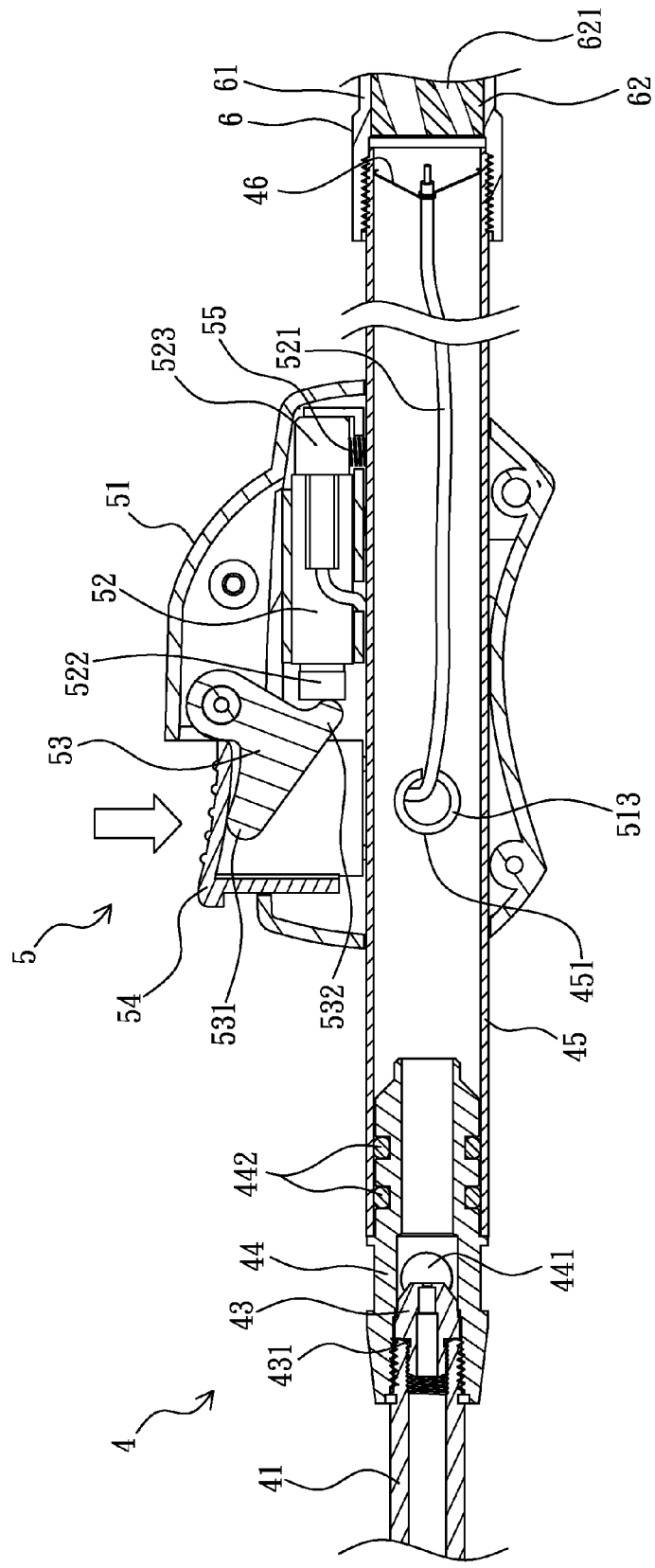
FIG. 7 is a cross sectional view illustrating the operation of the ignition device according to the first embodiment of the present invention.
Figure 8:
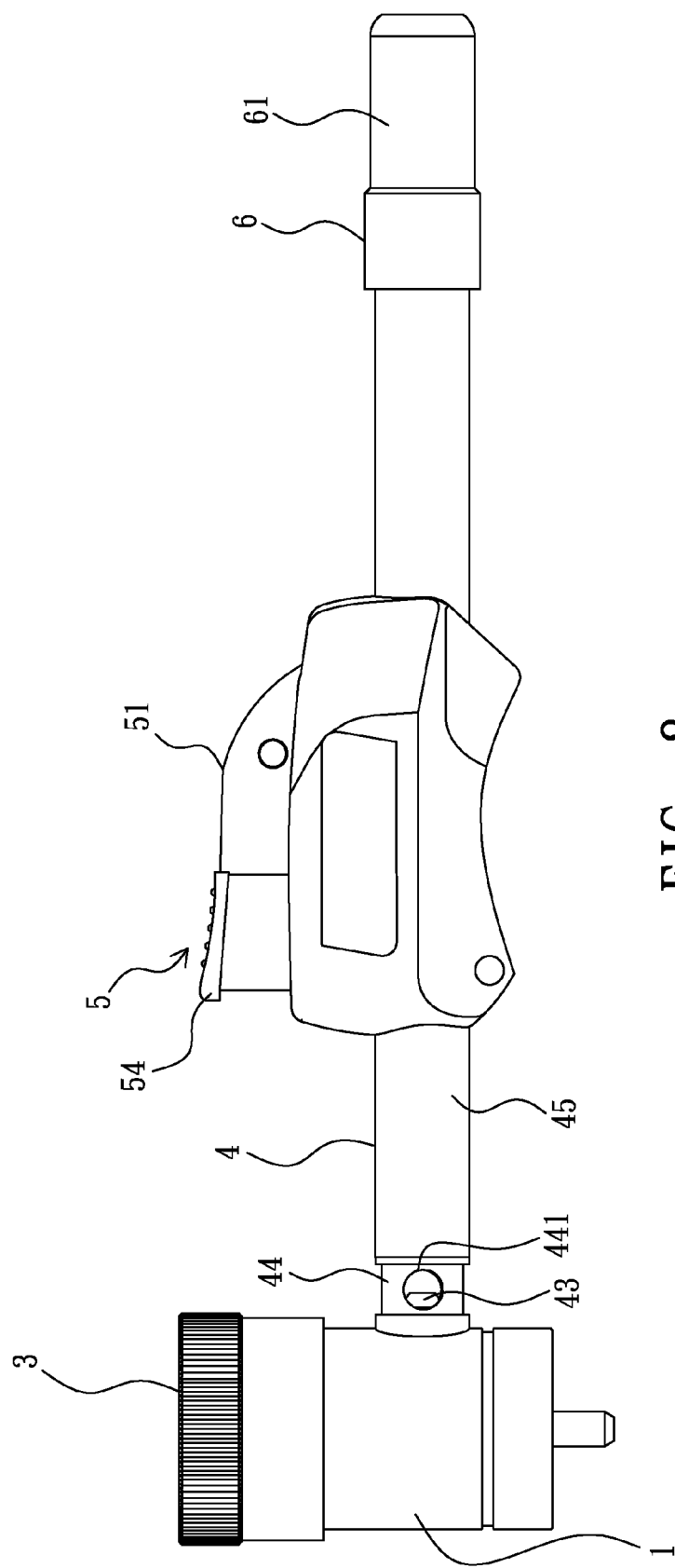
FIG. 8 is a plan view illustrating the gas combustor according to a second embodiment of the present invention.

Referring from FIG. 1 to FIG. 8, wherein FIG. 1 is a perspective view illustrating the gas combustor according to a first embodiment of the present invention; FIG. 2 is a perspective exploded view illustrating the base, the pressure stabilizing device and the gas intake valve according to the first embodiment of the present invention; FIG. 3 is a cross sectional view illustrating the assembly of the base, the pressure stabilizing device and the gas intake valve shown in FIG. 2 according to the first embodiment of the present invention; FIG. 4a is a cross sectional view illustrating the operation of the pressure stabilizing device and the gas intake valve according to the first embodiment of the present invention; FIG. 4b is another cross sectional view illustrating the operation of the pressure stabilizing device and the gas intake valve according to the first embodiment of the present invention; FIG. 5 is a perspective exploded view illustrating the gas discharge device, the ignition device and the combustion device according to the first embodiment of the present invention; FIG. 6 is a partial cross sectional view illustrating the assembly of the gas discharge device, the ignition device and the combustion device shown in FIG. 5 according to the first embodiment of the present invention; FIG. 7 is a cross sectional view illustrating the operation of the ignition device according to the first embodiment of the present invention; and FIG. 8 is a plan view illustrating the gas combustor according to a second embodiment of the present invention.

As shown from FIG. 1 to FIG. 7, the gas combustor provided by the present invention substantially comprises a base 1, a gas intake valve 2, a pressure stabilizing device 3, a gas discharge device 4, an ignition device 5 and a combustion device 6.

Referring from FIG. 1 to FIG. 3, the bottom and the top of the base 1 are axially and respectively formed with a connection hole 11 and a combination hole 12, a neck hole 13 having a smaller caliber is formed between and communicated with the connection hole 11 and the combination hole 12. The periphery of an inner wall of the connection hole 11 is formed with an engaging part 111, e.g. an inner thread, used for being engaged with a gas tank; the bottom of the neck hole 13 is formed with a connection nozzle 112 screwed with a gas discharge valve of the gas tank. Wherein, the inner wall at the top of the connection hole 11 is provided with a seal washer 113, the top of the connection nozzle 112 is radially extended with a fin piece 112a abutted against the seal washer 113, thereby preventing the seal washer 113 from being released from the connection hole 11, so the tightening effect for engaging with the gas discharge valve of the gas tank is enhanced.

The gas intake valve 2 is disposed in the neck hole 13 of the base 1 and abutted against the top of the connection nozzle 112. The interior of the neck hole 13 is formed with a stepped block wall 131, the outer periphery of a valve member 21 of the gas intake valve 2 is protrudingly formed with a flange 211 abutted against the block wall 131 and provided with a seal ring 212, wherein the bottom of a valve tube 213 axially formed inside the valve member 21 is installed with a filter member 22, the filter member 22 is disposed adjacent to a material feeding tube 112b axially formed on the connection nozzle 112, the filter member 22 is preferably to be a sintered member have micro pores and made by powder metallurgy, thereby the filter member 22 being enabled to filter the impurities contained in the fuel entering the gas intake valve 2. The filter member 22 is preferably to be disposed in a sleeve tube 23, and the sleeve tube 23 is further fastened at the bottom of the valve tube 213, and the top of a valve pin 24 protrudes out of a tube opening 214 formed at and communicated with the top of the valve tube 213, a plug 241 outwardly protruded from the bottom is provided with a seal ring 242, a first spring 25 is installed between the plug 241 and the sleeve tube 23, so the valve pin 24 can be received with an external axial force provide by the pressure stabilizing device 3 disposed above, thereby allowing the plug 241 and the provided seal ring 242 to be downwardly moved, and the first spring 25 is compressed, the tube opening 214 at the top of the valve tube 213 is opened, thereby allowing the fuel to be introduced into a vaporizing chamber 122 formed below the pressure stabilizing device 3 for processing the vaporizing operation.

The pressure stabilizing device 3 is disposed in the combination hole 12 at the top of the base 1, the pressure stabilizing device 3 includes a diaphragm 31, a position limiting piece 32, a second spring 33, a regulation seat 34, a fasten seat 35 and a knob 36. The diaphragm 31 is an elastic sheet member made of a polymer material, the periphery thereof is connected to the block wall 121 inwardly protruded at the bottom of the combination hole 12, so the mentioned vaporizing chamber 122 is formed between the bottom of the diaphragm 31 and the neck hole 13, and the vaporizing chamber 122 is laterally in communication with a gas discharge port 14 formed at one side of the base 1. Wherein, the bottom and the top of the diaphragm 31 are connected to a passive member 311 and a support member 312 respectively sleeved with the valve pin 24 and the second spring 33, the periphery of the position limiting piece 32 having its center being protruded is connected above the diaphragm 31, and the upper portion of the support member 312 is protruded out of a position limiting hole 321 preformed at the center of the position limiting piece 32 so as to be sleeved with one end of the second spring 33, the other end of the second spring 33 is sleeved at an inner wall formed at the top of the regulation seat 34.

The regulation seat 34 is rotationally screwed in the fasten seat 35, and a shaft rod 341 formed at the top is protruded out of an opening formed at the top of the fasten seat 35, then the fasten seat 35 is screwed in the combination hole 12, the bottom periphery of the fasten seat 35 is served to press the periphery of the position limiting piece 32 and the diaphragm 31 against the block wall 121 formed at the bottom of the combination hole 12, lastly the mentioned knob 36 is connected to the shaft rod 341 at the top of the regulation seat 34, thereby enabling the knob 36 to synchronously drive the regulation seat 34 to rotate in the fasten seat 35, so the assembly of the pressure stabilizing device 3 and the base 1 is finished.

In addition, a flange 342 formed at the bottom of the regulation seat 34 is provided with a seal ring 343 and a friction ring 344 respectively in the axial and the radial direction, so when the seal ring 343 at the top of the flange 342 is abutted against the block wall 351 protruded inside the fasten seat 35, a limit is defined for the regulation seat 34 upwardly moving relative to the fasten seat 35; and when the regulation seat 34 is rotated in the fasten seat 35, a special feeling is provided to a user's hand through the friction interfere generated while the friction ring 344 being rotated against the inner wall of the fasten seat 35.

As shown in FIG. 3, when the pressure stabilizing device 3 is in a closed state, the second spring 33 disposed between the regulation seat 34 and the support member 312 at the top of the diaphragm 31 is in an energy releasing (stretched) state, the passive member 311 at the bottom of the diaphragm 31 does not apply a force to the valve pin 24, as such, the first spring 25 in the gas intake valve 2 is also in an energy releasing state, and the plug 241 of the valve pin 24 and the seal ring 242 thereof are abutted against the tube opening 214 at the top of the valve tube 213, the gas intake valve 2 is therefore in a closed state and unable to eject fuel to the vaporizing chamber 122 below the pressure stabilizing device 3.

As shown in FIG. 4a, when the knob 36 is rotated, the regulation seat 34 is driven to rotate in the fasten seat 35 and generate an axial movement, so the regulation seat 34 enables the second spring 33 to be in an energy storing (compressed) state, and the support member 312, the central part of the diaphragm 31, the passive member 311, the plug 241 of the valve pin 24 and the seal ring 242 are synchronously moved downwardly, thereby opening the tube opening 214 at the top of the valve tube 213 of the gas intake valve 2. At this moment, the gas tank engaged with the connection hole 11 at the bottom of the base 1 is served to supply liquid and/or gaseous fuel to pass the connection nozzle 112, the filter member 22 of the gas intake valve 2 and the valve tube 213 thereby allowing the filtered liquid and/or gaseous fuel to be introduced into the vaporizing chamber 122, so the liquid fuel which has not yet been fully vaporized can be vaporized, and the fully-vaporized fuel gas is enabled to flow towards the gas discharge port 14.

Because a gas ejecting nozzle 43 has a smaller caliber, excessive fuel gas or liquid fuel which has not yet been vaporized would be rapidly filled and remained in the vaporizing chamber 122. As shown in FIG. 4b, when the pressure in the vaporizing chamber 122 is rapidly increased, the central part of the diaphragm 31 is elastically moved upwardly, and the second spring 33 is compressed, at this moment, the valve pin 24 is upwardly moved and the first spring 25 is stretched, so the tube opening 214 at the top of the valve member 21 is sealed by the seal ring 242, thereby terminating the supply of gaseous and/or liquid fuel.

When the fuel gas in the vaporizing chamber 122 is gradually ejected through the gas ejecting nozzle 43, the pressure in the vaporizing chamber 122 is gradually reduced, so the second spring 33 is stretched for pushing the support member 312, the central part of the diaphragm 31 and the passive member 311 to be downwardly moved, the valve pin 24 is downwardly moved and the first spring 25 is compressed, so the supplying state of gaseous and/or liquid fuel as shown in FIG. 4a is formed. As a matter of fact, the fuel flows rapidly between the gas intake valve 2 and the pressure stabilizing device 3 in the base 1, the diaphragm 31 and the valve pin 24 are enabled to move rapidly and reciprocally, thereby the liquid fuel being enabled to be fully vaporized to fuel gas and an effect of maintaining constant pressure being achieved.

As such, the pressure stabilizing device 3 can be served as a switch for the supply of fuel, the regulation seat 34 can be rotated for being axially ascended/descended in the fasten seat 35 so as to compress or stretch the second spring 33 between the regulation seat 34 and the support member 312 at the top of the diaphragm 31 for adjusting the pressure. When the pressure supplied by the second spring 33 to the diaphragm 31 is greater than the pressure of the first spring 25 and the fuel in the gas intake valve 2, and when the pressure supplied by the second spring 33 to the diaphragm 31 is smaller than the pressure for vaporizing fuel in the vaporizing chamber 122, the diaphragm 31, the support member 312 and the passive member 311 reciprocally and synchronously drive the valve pin 24 of the gas intake valve 2 and the plug 241 at the bottom to axially move, thereby enabling the tube opening 214 at the top of the gas intake valve 2 to be opened or sealed, so as to adjust the pressure of fuel entering the vaporizing chamber 122 and to adjust the flow of vaporized fuel gas flowing towards the gas discharge port 14, the flame generated in the combustion device 5 can therefore be altered.

As shown in FIG. 1, FIG. 5 and FIG. 6, wherein FIG. 5 is a perspective exploded view illustrating the gas discharge device, the ignition device and the combustion device according to the first embodiment of the present invention; and FIG. 6 is a partial cross sectional view illustrating the assembly of the gas discharge device, the ignition device and the combustion device shown in FIG. 5 according to the first embodiment of the present invention. The gas discharge device 4 includes a gas pipe 41, two ends of the gas pipe 41 are respectively formed with an engaging part 42 communicated with the gas discharge port 14 and the mentioned gas ejecting nozzle 43. As shown in FIG. 3 and FIG. 5, the engaging part 42 includes an engaging head 421 sleeved with the gas pipe 41 and a gas guiding nozzle 422 e.g. screwed at the upstream end of the gas pipe 41, the engaging head 421 is engaged, e.g. screwed, in the gas discharge port 14, thereby allowing the fuel gas which has been fully vaporized in the vaporizing chamber 122 to be discharged from the gas discharge port 14, and to pass the gas guiding nozzle 422 and enter the gas pipe 41 then ejected from the gas ejecting nozzle 43 at the downstream end.

The downstream end of the gas pipe 41 including the gas ejecting nozzle 43 is further connected, e.g. screwed, with a mixing tube 44, the mixing tube 44 is radially formed with at least an air vent 441 at the location corresponding to the gas ejecting nozzle 43, as such, when the fuel gas is ejected from the gas ejecting nozzle 43, the current of gas thus generated is served to introduce ambient air into the mixing tube 44 through the air vent 441, so the air and the fuel gas are mixed then flow towards the downstream end of the mixing tube 44. The downstream end of the mixing tube 44 is further sleeved with a gas guiding tube 45 allowing the mixed fuel gas to be introduced therein.

Wherein, at least a seal ring 423, 424, 431, 442 is installed between the gas pipe 41 and the engaging head 421, the gas discharge port 14 and the gas guiding nozzle 422, the gas ejecting nozzle 43 and the gas pipe 41, the mixing tube 44 and the gas guiding tube 45, thereby forming an airtight effect.

The ignition device 5 includes a casing unit 51 fastened on the gas guiding tube 45, the casing unit 51 consists of a left casing 511 and a right casing 512 engaging with each other, and the two casings 511, 512 are radially and oppositely formed with a pair of tenons 513 inserted in insertion holes 451 correspondingly formed on the gas guiding tube 45, thereby forming an engagement state, then a screw is adopted to pass a casing, e.g. the left casing 511, and be locked on the other casing, e.g. the right casing 512, thereby fastening the casing unit 51 on the gas guiding tube 45.

An igniter 52 is axially installed and fastened in the casing unit 51, an electric wire 521 of the igniter 52 passes the tenon 513 for entering the gas guiding tube 45, and one mobile end of the electric wire 521 is combined in an elastic wire clamping positioning device 46, the wire clamping positioning device 46 is disposed at the opening of the gas guiding tube 45 and disposed at an inner side of a flame nozzle 62 of the mentioned combustion device 6. Moreover, a T-shaped pull rod 53 is pivoted in the casing unit 51, two ends of the pull rod 53 are defined as a first end 531 and a second end 532 respectively abutted against at the top inner wall of a push button 54 disposed at the opening at the top of the casing unit 51 and a push rod 522 of the igniter 52, and an elastic electric conductive member 55 is provided for being connected between a cathode connecting joint 523 of the igniter 52 and the gas guiding tube 45, thereby forming an electric conducting loop.

The combustion device 6 is provided with a flame tube 61 e.g. being screwed at the downstream end of the gas guiding tube 45, the flame tube 61 is installed with the flame nozzle 62 having plural spiral flow passages 621 at the periphery.

When the mixed fuel gas flows from the gas guiding tube 45 of the gas discharge device 4 towards the flame tube 61, and passes each of the spiral flow passages 621 of the flame nozzle 62 then is ejected from the opening of the flame tube 61. At this moment, as shown in FIG. 7, the user immediately pushes the push button 54, so the first end 531 of the pull rod 53 is squeezed to rotate in the counterclockwise direction, and then the second end 532 squeezes the push rod 522 of the igniter 52, so the high voltage electrostatic generated by the igniter 52 is transferred by the electric wire 521 thereby forming electrostatic spark at the location of flame nozzle 62 so as to ignite the mixed fuel gas passing the flame nozzle 62. At this moment, the user can release the push button 54, so the push rod 522 of the igniter 52 is enabled to be recovered to the initial position, and the pull rod 53 and the push button 54 are therefore pushed to be recovered to the original position.

As shown in FIG. 8, which is a plan view illustrating the gas combustor according to a second embodiment of the present invention. The difference between this embodiment and the first embodiment is that the gas pipe and the engaging part are not installed, but the gas ejecting nozzle 43 and the mixing tube 44 are directly installed in the gas discharge port 14, so the fuel gas which has been fully vaporized in the vaporizing chamber 122 is discharged from the gas discharge port 14 and passed the gas ejecting nozzle 43 thereby ejecting the fuel gas. The mixing tube 44 is radially formed with at least an air vent 441 corresponding to the location of the gas ejecting nozzle 43, as such, when the fuel gas is ejected from the gas ejecting nozzle 43, the generated current of gas is served to introduce ambient air into the mixing tube 44 through the air vent 441, so the air and the fuel gas are mixed then flow towards the downstream end of the mixing tube 44 to the gas guiding tube 45.

As what has been mentioned above, the present invention has following advantages: through installing the filter member at the bottom of the gas intake valve, the impurities contained in liquid and/or gaseous fuel can be filtered before entering the vaporizing chamber, thereby solving the problem of the gas ejecting nozzle of the gas discharge device being easy to be clogged; in addition, the pressure stabilizing device can not only be served as a switch for the supply of fuel but also can be used for regulating the flow of fuel gas thereby adjusting the flame generated in the combustion device; moreover, the gas discharge device is further installed with an ignition device, so the gas combustor is enabled to self ignite, thereby improving the inconvenience of requiring an external fire source to ignite the mixed fuel gas ejected from the ignition device. Accordingly, the gas combustor provided by the present invention is novel and practice in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A gas combustor, comprising:
a gas intake valve, a bottom of a valve tube axially formed in a valve member being installed with a filter member, a first spring being installed above said filter member and inside said valve tube, the top of a valve pin being protruded out of a tube opening formed at and communicated with the top of said valve tube, a plug outwardly protruded at the bottom of said valve pin being abutted against said first spring, said plug being enabled to seal said tube opening through said first spring being stretched, and when the top of said valve pin being axially subject to a force, said valve pin and said plug being downwardly moved, said first spring being compressed thereby enabling said tube opening to be opened; and
a base, a bottom and a top of said base are axially and respectively formed with a connection hole connected with a gas tank and a combination hole connected with a pressure stabilizing device, a neck hole having a smaller caliber and allowing said gas intake valve to be installed is formed between and communicated with said connection hole and said combination hole; wherein a vaporizing chamber is formed between said gas intake valve and said pressure stabilizing device, said vaporizing chamber is laterally in communication with a gas discharge port radially formed in said base;
wherein said pressure stabilizing device includes:
a diaphragm, which is an elastic sheet member made of a polymer material, the periphery thereof is connected to a block wall protruded at the bottom of said combination hole, so said vaporizing chamber is formed between the bottom of said diaphragm and said gas intake valve of said neck hole; wherein, the bottom of said diaphragm is provided with a passive member connected with said valve pin at the top of said gas intake valve, the top thereof is provided with a support member; and a position limiting piece, said position limiting piece connected between said diaphragm and a fasten seat and having a center protruding axially; and
a regulation seat, rotationally screwed in the fasten seat, and a shaft rod formed at the top is protruded out of an opening formed at the top of said fasten seat, said fasten seat is fastened in said combination hole of said base, the bottom periphery of said fasten seat is served to press the periphery of said diaphragm against said block wall formed at the bottom of said combination hole; and a second spring is installed between an inner wall at the top of said regulation seat and said support member; through rotating said regulation seat, said regulation seat is enabled to be axially ascended/descended in said fasten seat so as to compress or stretch said second spring disposed between said regulation seat and said support member at the top of said diaphragm for adjusting the pressure; when the pressure supplied by said second spring to said diaphragm is greater than the pressure of said first spring and the fuel in said gas intake valve, and when the pressure supplied by said second spring to said diaphragm is smaller than the pressure for vaporizing fuel in said vaporizing chamber, said diaphragm, said support member and said passive member reciprocally and synchronously drive said valve pin of said gas intake valve and said plug at the bottom to axially move, thereby enabling said tube opening at the top of said gas intake valve to be opened or sealed, so as to adjust the pressure of fuel entering said vaporizing chamber and to adjust the flow of vaporized fuel gas flowing towards said gas discharge port.

2. The gas combustor as claimed in claim 1, wherein said filter member is a sintered member have micro pores, said filter member is disposed in a sleeve tube provided at the bottom of said valve tube, the top of said sleeve tube is disposed adjacent to said first spring.

3. The gas combustor as claimed in claim 1, wherein the outer periphery of said valve member is protrudingly formed with a flange, and said flange and said plug of said valve pin are respectively provided with a seal ring.

4. The gas combustor as claimed in claim 1, wherein the periphery of an inner wall of said connection hole is formed with an engaging part for being engaged with said gas tank; the bottom of said neck hole is formed with a connection nozzle fitted with a gas discharge valve of said gas tank, and said connection nozzle is disposed adjacent to the bottom of said gas intake valve.

5. The gas combustor as claimed in claim 1, wherein said pressure stabilizing device is further installed with a knob connected to said shaft rod at the top of said regulation seat.

6. The gas combustor as claimed in claim 1, wherein said pressure stabilizing device further includes a position limiting piece having the center being protruded, the periphery thereof is connected above said diaphragm, and the upper portion of said support member is protruded out of a position limiting hole preformed at the center of said position limiting piece.

7. The gas combustor as claimed in claim 1, wherein a flange radially formed at the bottom of said regulation seat is provided with a friction ring generating friction interfere with the inner wall of said fasten seat.

8. A gas combustor, comprising:
a gas intake valve, a bottom of a valve tube axially formed in a valve member being installed with a filter member, a first spring being installed above said filter member and inside said valve tube, the top of a valve pin being protruded out of a tube opening formed at and communicated with the top of said valve tube, a plug outwardly protruded at the bottom of said valve pin being abutted against said first spring, said plug being enabled to seal said tube opening through said first spring being stretched, and when the top of said valve pin being axially subject to a force, said valve pin and said plug being downwardly moved, said first spring being compressed thereby enabling said tube opening to be opened;
a base, a bottom and a top of said base are axially and respectively formed with a connection hole connected with a gas tank and a combination hole connected with a pressure stabilizing device, a neck hole having a smaller caliber and allowing said gas intake valve to be installed is formed between and communicated with said connection hole and said combination hole; wherein a vaporizing chamber is formed between said gas intake valve and said pressure stabilizing device, said vaporizing chamber is laterally in communication with a gas discharge port radially formed in said base;
wherein said pressure stabilizing device includes:
a diaphragm, which is an elastic sheet member made of a polymer material, the periphery thereof is connected to a block wall protruded at the bottom of said combination hole, so said vaporizing chamber is formed between the bottom of said diaphragm and said gas intake valve of said neck hole; wherein, the bottom of said diaphragm is provided with a passive member connected with said valve pin at the top of said gas intake valve, the top thereof is provided with a support member; and a position limiting piece, said position limiting piece connected between said diaphragm and a fasten seat and having a center protruding axially; and
a regulation seat, rotationally screwed in the fasten seat, and a shaft rod formed at the top is protruded out of an opening formed at the top of said fasten seat, said fasten seat is fastened in said combination hole of said base, the bottom periphery of said fasten seat is served to press the periphery of said diaphragm against said block wall formed at the bottom of said combination hole; and a second spring is installed between an inner wall at the top of said regulation seat and said support member; through rotating said regulation seat, said regulation seat is enabled to be axially ascended/descended in said fasten seat so as to compress or stretch said second spring disposed between said regulation seat and said support member at the top of said diaphragm for adjusting the pressure; when the pressure supplied by said second spring to said diaphragm is greater than the pressure of said first spring and the fuel in said gas intake valve, and when the pressure supplied by said second spring to said diaphragm is smaller than the pressure for vaporizing fuel in said vaporizing chamber, said diaphragm, said support member and said passive member reciprocally and synchronously drive said valve pin of said gas intake valve and said plug at the bottom to axially move, thereby enabling said tube opening at the top of said gas intake valve to be opened or sealed, so as to adjust the pressure of fuel entering said vaporizing chamber and to adjust the flow of vaporized fuel gas flowing towards said gas discharge port; and a gas discharge device connected to said gas discharge port of said base, and a combustion device connected to said gas discharge device, wherein:
said gas discharge device includes:
a gas pipe, two ends thereof are respectively formed with an engaging part communicated with said gas discharge port and a gas ejecting nozzle; and
a mixing tube, connected to the downstream end of said gas pipe, and radially formed with at least an air vent at the location corresponding to said gas ejecting nozzle for mixing the fuel gas ejected from said gas ejecting nozzle and the air introduced through said air vent thereby forming a mixed fuel gas;
and said combustion device includes:
a flame tube, connected to the downstream end of said mixing tube, and the interior of said flame tube is installed with a flame nozzle allowing fuel gas to pass.

9. The gas combustor as claimed in claim 8, wherein said engaging part includes an engaging head sleeved with said gas pipe and a gas guiding nozzle fitted at the upstream end of said gas pipe, said engaging head is fitted in said gas discharge port, thereby allowing the fuel gas discharged from said gas discharge port to pass said gas guiding nozzle and enter said gas pipe, then the fuel gas is ejected from said gas ejecting nozzle at the downstream end.

10. The gas combustor as claimed in claim 8, wherein a gas guiding pipe is further installed between said mixing tube of said gas discharge device and said flame tube of said combustion device, said gas guiding pipe is further installed with an ignition device, said ignition device includes:
a casing unit, consists of a left casing and a right casing engaging with each other, and said two casings are radially and oppositely formed with a pair of tenons inserted in insertion holes correspondingly formed on said gas guiding tube, thereby fastening said casing unit on said gas guiding tube;
an igniter, axially fastened in said casing unit, an electric wire of said igniter passes said tenon for entering said gas guiding pipe, and one mobile end of said electric wire is combined in an elastic wire clamping positioning device, said wire clamping positioning device is disposed at said opening of said gas guiding tube and adjacent to an inner side of said flame nozzle of said combustion device, wherein two ends of said igniter are respectively installed with a push rod and a cathode connecting joint, and an elastic electric conductive member is installed between said cathode connecting joint and said gas guiding pipe;

a pull rod, formed in a T shape, pivoted in said casing unit, two ends of said pull rod are respectively defined as a first end and a second end abutted against said push rod; and a push button, disposed in said opening formed at the top of said casing unit, and the top inner wall thereof is abutted again said first end of said pull rod; through pushing said push button, said first end of said pull rod is squeezed to rotate, and said second end squeezes said push rod of said igniter, the high voltage electrostatic generated by said igniter is transferred by said electric wire thereby forming electrostatic spark at the location of flame nozzle so as to ignite said mixed fuel gas passing said flame nozzle.

11. A gas combustor, comprising:

a gas intake valve, a bottom of a valve tube axially formed in a valve member being installed with a filter member, a first spring being installed above said filter member and inside said valve tube, the top of a valve pin being protruded out of a tube opening formed at and communicated with the top of said valve tube, a plug outwardly protruded at the bottom of said valve pin being abutted against said first spring, said plug being enabled to seal said tube opening through said first spring being stretched, and when the top of said valve pin being axially subject to a force, said valve pin and said plug being downwardly moved, said first spring being compressed thereby enabling said tube opening to be opened;

a base, a bottom and a top of said base are axially and respectively formed with a connection hole connected with a gas tank and a combination hole connected with a pressure stabilizing device, a neck hole having a smaller caliber and allowing said gas intake valve to be installed is formed between and communicated with said connection hole and said combination hole; wherein a vaporizing chamber is formed between said gas intake valve and said pressure stabilizing device, said vaporizing chamber is laterally in communication with a gas discharge port radially formed in said base;

wherein said pressure stabilizing device includes:

a diaphragm, which is an elastic sheet member made of a polymer material, the periphery thereof is connected to a block wall protruded at the bottom of said combination hole, so said vaporizing chamber is formed between the bottom of said diaphragm and said gas intake valve of said neck hole; wherein, the bottom of said diaphragm is provided with a passive member connected with said valve pin at the top of said gas intake valve, the top thereof is provided with a support member; and a position limiting piece, said position limiting piece connected between said diaphragm and a fasten seat and having a center protruding axially; and a regulation seat, rotationally screwed in the fasten seat, and a shaft rod formed at the top is protruded out of an opening formed at the top of said fasten seat, said fasten seat is fastened in said combination hole of said base, the bottom periphery of said fasten seat is served to press the periphery of said diaphragm against said block wall formed at the bottom of said combination hole; and a second spring is installed between an inner wall at the top of said regulation seat and said support member; through rotating said regulation seat, said regulation seat is enabled to be axially ascended/descended in said fasten seat so as to compress or stretch said second spring disposed between said regulation seat and said support member at the top of said diaphragm for adjusting the pressure; when the pressure supplied by said second spring to said diaphragm is greater than the pressure of said first spring and the fuel in said gas intake valve, and when the pressure supplied by said second spring to said diaphragm is smaller than the pressure for vaporizing fuel in said vaporizing chamber, said diaphragm, said support member and said passive member reciprocally and synchronously drive said valve pin of said gas intake valve and said plug at the bottom to axially move, thereby enabling said tube opening at the top of said gas intake valve to be opened or sealed, so as to adjust the pressure of fuel entering said vaporizing chamber and to adjust the flow of vaporized fuel gas flowing towards said gas discharge port; and a gas discharge device connected to said gas discharge port of said base, and a combustion device connected to said gas discharge device, wherein:

said gas discharge device includes:

a gas ejecting nozzle, connected to said gas discharge port of said base; and a mixing tube, connected to said gas discharge port of said base, and radially formed with at least an air vent at the location corresponding to said gas ejecting nozzle for mixing the fuel gas ejected from said gas ejecting nozzle and the air introduced through said air vent thereby forming a mixed fuel gas;

and said combustion device includes:

a flame tube, connected to the downstream end of said mixing tube, and the interior of said flame tube is installed with a flame nozzle allowing fuel gas to pass.

12. The gas combustor as claimed in claim 11, wherein a gas guiding pipe is further installed between said mixing tube of said gas discharge device and said flame tube of said combustion device, said gas guiding pipe is further installed with an ignition device, said ignition device includes:

a casing unit, consists of a left casing and a right casing engaging with each other, and said two casings are radially and oppositely formed with a pair of tenons inserted in insertion holes correspondingly formed on said gas guiding tube, thereby fastening said casing unit on said gas guiding tube;

an igniter, axially fastened in said casing unit, an electric wire of said igniter passes said tenon for entering said gas guiding pipe, and one mobile end of said electric wire is combined in an elastic wire clamping positioning device, said wire clamping positioning device is disposed at said opening of said gas guiding tube and adjacent to an inner side of said flame nozzle of said combustion device, wherein two ends of said igniter are respectively installed with a push rod and a cathode connecting joint, and an elastic electric conductive member is installed between said cathode connecting joint and said gas guiding pipe;

a pull rod, formed in a T shape, pivoted in said casing unit, two ends of said pull rod are respectively defined as a first end and a second end abutted against said push rod; and a push button, disposed in said opening formed at the top of said casing unit, and the top inner wall thereof is abutted again said first end of said pull rod;

through pushing said push button, said first end of said pull rod is squeezed to rotate, and said second end squeezes said push rod of said igniter, the high voltage electrostatic generated by said igniter is transferred by said electric wire thereby forming electrostatic spark at the location of flame nozzle so as to ignite said mixed fuel gas passing said flame nozzle.

\* \* \* \* \*